United States Patent
Bradley et al.

(10) Patent No.: US 10,825,064 B1
(45) Date of Patent: Nov. 3, 2020

(54) PREVENTING DUPLICATE CONTENT SELECTION FOR DIGITAL PRESENTATION

(71) Applicant: Amazon Technologies, Inc., Seattle, WA (US)

(72) Inventors: Andrew J. Bradley, Edinburgh (GB); Andrew Douglas Birkett, Edinburgh (GB); Anirudh Dastidar, West Midlands (GB); Fred Grossman, Nordrhein Westfalen (DE); Anthony Richard McBryan, West Lothian (GB); Sebastiano Merlino, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 15/457,502

(22) Filed: Mar. 13, 2017

(51) Int. Cl.
*G06Q 30/02* (2012.01)

(52) U.S. Cl.
CPC ................. *G06Q 30/0282* (2013.01)

(58) Field of Classification Search
USPC .......................... 705/14.1–14.73
See application file for complete search history.

(56) References Cited

U.S. PATENT DOCUMENTS

| | | | |
|---|---|---|---|
| 8,010,407 | B1 | 8/2011 | Santoro et al. |
| 8,229,861 | B1 | 7/2012 | Trandal et al. |
| 9,407,975 | B2 | 8/2016 | Grusd |
| 9,672,554 | B2 * | 6/2017 | Dumon ............. G06F 17/30979 |
| 10,460,348 | B1 | 10/2019 | Peddinti et al. |
| 2001/0054008 | A1 | 12/2001 | Miller et al. |
| 2002/0161673 | A1 * | 10/2002 | Lee ............ G06Q 30/02 709/224 |
| 2005/0004880 | A1 | 1/2005 | Musgrove et al. |
| 2005/0033803 | A1 | 2/2005 | Vleet et al. |
| 2005/0289039 | A1 | 12/2005 | Greak |
| 2008/0103876 | A1 | 5/2008 | Armstrong et al. |
| 2008/0154765 | A1 | 6/2008 | Wolfe |

(Continued)

OTHER PUBLICATIONS

Colleen Connolly-Ahern, Accounts, media, and Culture: An international impression management experiment (Year: 2004).*

(Continued)

*Primary Examiner* — John Van Bramer
*Assistant Examiner* — Darnell A Pouncil
(74) *Attorney, Agent, or Firm* — Eversheds Sutherland (US) LLP

(57) ABSTRACT

Systems, methods, and computer-readable media are disclosed for preventing duplicate content selection for digital presentation. In one embodiment, an example method may include determining a first bid request for a first content delivery slot at a first time, the first bid request having a first user identifier, determining a ranking of candidate product identifiers for which the first user identifier is eligible at the first time, and determining a second bid request for a second content delivery slot at a second time, the second bid request having the first user identifier, where the second time is within a predetermined time interval of the first time. Example methods may include determining an impression counter value for the first user identifier at the second time, selecting a product identifier from the candidate product identifiers using the impression counter value, and determining a first bid amount using the product identifier.

20 Claims, 8 Drawing Sheets

(56) References Cited

U.S. PATENT DOCUMENTS

| | | | |
|---|---|---|---|
| 2008/0195475 A1* | 8/2008 | Lambert | G06Q 30/02 |
| | | | 705/14.1 |
| 2009/0030786 A1 | 1/2009 | Rosler et al. | |
| 2011/0251875 A1* | 10/2011 | Cosman | G06Q 30/0273 |
| | | | 705/7.31 |
| 2011/0264551 A1 | 10/2011 | Lau | |
| 2012/0036023 A1 | 2/2012 | Das et al. | |
| 2012/0246003 A1 | 9/2012 | Hart et al. | |
| 2014/0258032 A1 | 9/2014 | Psota et al. | |
| 2015/0206109 A1 | 7/2015 | Caldwell et al. | |
| 2017/0017971 A1 | 1/2017 | Moreau et al. | |
| 2017/0323380 A1* | 11/2017 | Alberti | G06Q 30/08 |

OTHER PUBLICATIONS

Pepsi Cola-Soda Radio 1998, Ebay (Year: 2019); 2 pgs.
Pepsi is Launching an Android Phone in China, The Verge, Vox Media, LLC; (Year 2016); 4 pgs.
Pepsi Instant Camera, Ebay (2019); 2 pgs.
Puru Kulkarni, et al. "Importance-aware Bloom Filter for Set Membership Queries in Streaming Data", (2013); 10 pgs.

\* cited by examiner

US 10,825,064 B1

PREVENTING DUPLICATE CONTENT SELECTION FOR DIGITAL PRESENTATION

BACKGROUND

Content may be presented on electronic devices to users such that users can consume the content. Users may consume or interact with certain content while other content may not be consumed or interacted with. Presenting the same or similar content to a user more than once at a time, or more than once within a short period of time, may negatively impact effectiveness of the content because the user may be unlikely to interact with the content the second time it is presented if the user did not interact with it the first time it was presented. Further, repeated presentation of content may annoy a user or may otherwise reduce an effectiveness of the content because the user may not interact with the content either the first time it was presented or the second time it was presented. Further, presentation of content related to potential gifts may remove an element of surprise for a user, or presentation of content related to inappropriate items may negatively impact a user experience.

Figure 1:
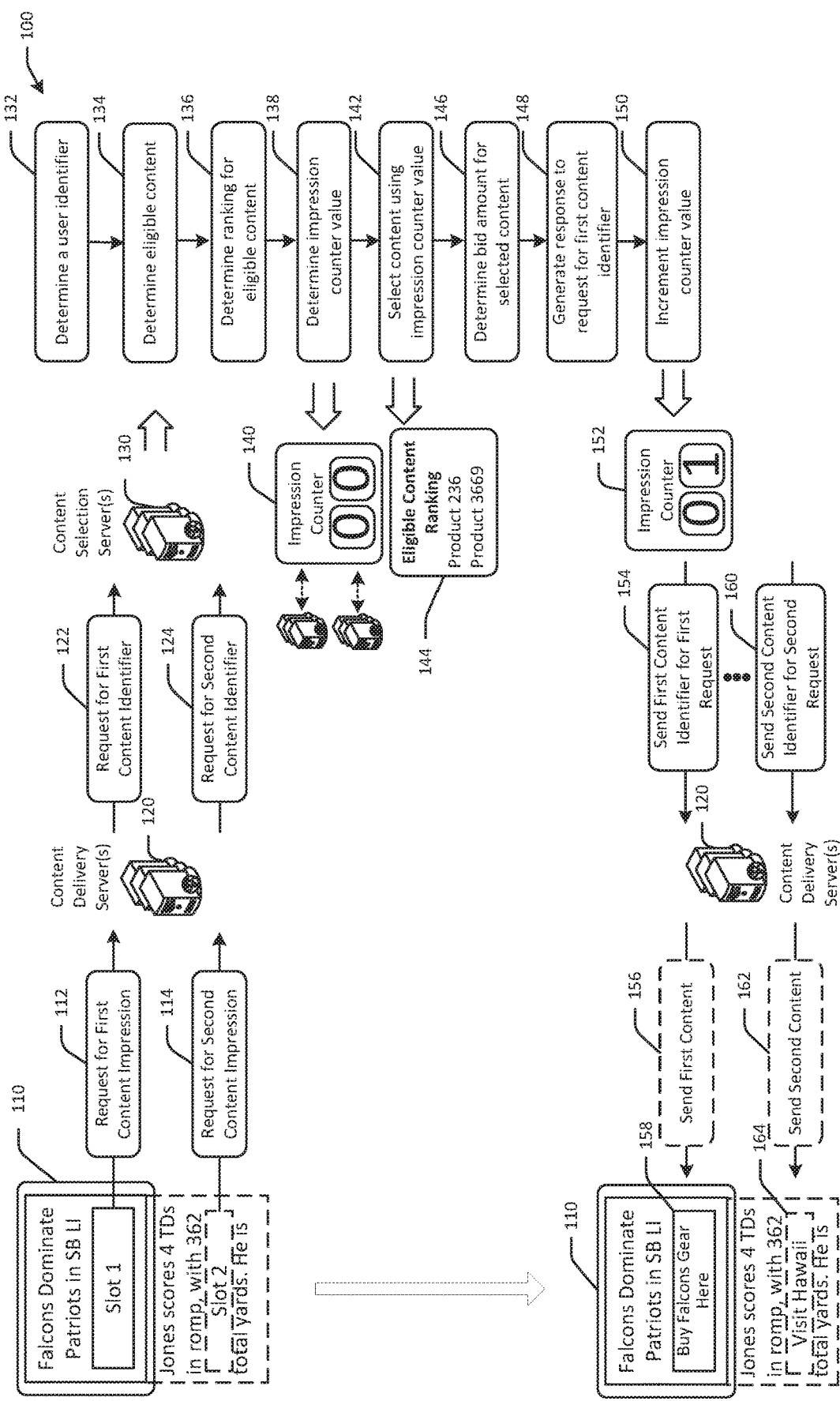
FIG. 1 is a hybrid system and process diagram for preventing duplicate content selection for digital presentation in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may consume the digital content. Content for delivery may include content such as text, images, videos, audio, and other content. Some content may include images of particular products, as well as additional product related information. Content may be targeted to specific users or groups of users. For example, targeting criteria for content that includes a product such as a smartphone may indicate that the content is to be presented to users in geographic locations where the smartphone may be available for purchase, as well as users that meet certain demographic, income, age or age range, and/or user preference criteria. Other targeting criteria may be used.

In some instances, a user may browse, in a digital environment, one or more products. For example, a user may view product reviews, product ratings, user feedback, product specifications, and other information for a particular product while contemplating a purchase of the product. Certain user interactions with the product or with information associated with the product may indicate a level of interest and/or a user intent regarding the product. For example, if a user navigates to product reviews of the product, the user may be interested in purchasing the product. If the user spends several minutes at the product reviews, that may be an indication that the user read one or more of the product reviews and that the user is interested in purchasing the product. In another example, if the user adds the product to a digital shopping cart, or if the user searches for discount codes for the product, such user interactions may reflect a level of interest in the product. Therefore, presenting content to the user that is related to the product may result in the user making a purchase of the product. Some content may have or be associated with targeting criteria that includes users that have previously viewed or otherwise interacted with a product webpage, a product information page, or other product related data.

However, presenting content related to a particular product or service more than once at a time (e.g., twice on the same webpage, etc.), or multiple times within a short period of time (e.g., twice in two minutes, etc.), may not increase an effectiveness of the content. For example, if content associated with a particular product is presented at two different content delivery slots in an application, or at a webpage, the user may not interact with the second content if the user did not interact with the first content. Similarly, if the user did not interact with certain content, and then is shown the same or similar content 30 seconds later, the user may not interact with the second content either. Accordingly, presenting duplicate content impressions, or multiple impressions of similar content, within a short period of time or at the same time, may negatively impact content performance and/or a user experience, because the user may feel annoyed or bombarded by the content.

Embodiments of the disclosure may prevent duplicate presentation of content, or presentation of similar content multiple times, to users at the same time or within a short amount of time. Certain embodiments may therefore increase an effectiveness of content that is presented to users, and may increase user engagement and/or interaction with content. Certain embodiments may select content or product identifiers from amongst tens of millions of pieces of content or product identifiers, and may have a limited amount of time to select content for presentation. Accordingly, requests for content or product identifiers may be processed nearly or at the same time, and may be processed in parallel by different computing resources or systems. Therefore, certain embodiments may determine whether content or a product identifier has been presented to a user recently across a distributed computing environment. Some embodiments may determine whether a user is eligible for certain content, and may determine whether the content has been presented to the user recently, or is going to be presented to the user, as well as a probability that an impression of the selected content will be presented to the user. Certain embodiments may track a number of impressions or a number of bid requests that have been received for a certain user identifier, and may use the number of impressions or bid requests to select content for presentation for a subsequent bid request. For example, if an impression counter value, or a bid request value, for a user is 2, then there is a chance (depending on whether an auction process was conducted, and if so, whether the auction was won, for example) that the user was presented two impressions. Accordingly, for a third bid request, some embodiments may select a third-ranked content or product identifier for presentation to the user, because the user has (or may have) been presented impressions associated with the first-ranked and second-ranked content or product identifiers. Some embodiments may determine a probability that a particular impression, or a certain number of impressions, were presented to a user based at least in part on a number of bid requests. For example, if the impression counter value for a user identifier is 2, then a probability that two impressions were actually presented to the user may be determined. The probability may be a function of a bid amount associated with the respective first impression and second impression and/or responses to the respective bid requests, as well as other features, such as the user identifier for which the impression is to be presented and related user attributes, contextual information, and other features.

By using the counters and probability determinations described herein, a determination and/or selection of content or product identifiers can be made within a relatively short timeframe (e.g., within about 50 milliseconds or less), regardless of the size or number of potential products or content from which the selection is to be made, and duplicate selection of content and/or product identifiers can be prevented.

Further, certain embodiments may prevent selection of content or product identifiers that are or may be related to gifts for others. For example, a user may browse or interact with content related to a gift for another user (e.g., a wife may browse a gift for her husband, etc.). Certain embodiments may determine that such interactions are attributed to a potential gift, and may therefore prevent presentation of content related to the browsed product. Therefore, the husband may not be presented with content for the product that was browsed by his wife, in one example. Certain embodiments may prevent presentation or selection of content for product identifiers that may be inappropriate or offensive (e.g., sex toys, items with offensive language, etc.).

In some embodiments, users may be grouped or linked together in a linked user group 430, and content or product identifiers that are prevented from being presented to one of the users in a group may be extended across one or more, or all, of the users in the group. For example, if one user in a household browses content associated with a television, and the television is determined to likely be a gift for another user that may or may not be part of the household, then content related to televisions may be prevented from presentation to another user in the household. Accordingly, content selection may be improved, and selected content may have increased relevance to users.

This disclosure relates to, among other things, systems, methods, computer-readable media, techniques, and methodologies for preventing duplicate content selection for digital presentation. Embodiments may determine an impression counter value that may track a number of impressions that were presented to a particular user, or a maximum number of impressions that may have been presented to a particular user, over a time interval. The impression counter value may be periodically reset. The impression counter value may be used to select content and/or product identifiers for presentation to users in subsequent bid requests or impression requests. Certain embodiments may rank eligible content or candidate content for particular users, and may select content with a rank that corresponds to the impression counter value for bid requests.

Referring to FIG. 1, an example use case 100 for preventing duplicate content selection for digital presentation is depicted in accordance with one or more embodiments of the disclosure. A user may be using a device 110 to access digital content. For example, the user may use the device 110 to access news, videos, images, articles, or other digital content. The device 110 may request content from one or more content delivery servers 120 over one or more wired or wireless networks. For example, the device 110 may be a smartphone and may request digital content from the content delivery server 120 over a WiFi or cellular network. The content that is requested by the device 110 may have one or more content delivery slots, or portions of the content at which a third party (e.g., in some instances a party other than a content publisher, etc.) may present content in addition to the requested content. For example, a video may be presented before or after presentation of the requested content, an image or certain content may be presented in line with the requested content, and the like. In the example of FIG. 1, third party content may be presented at Slot 1 and Slot 2. Slot 1 may be a content delivery slot that is above the fold (e.g., presented at a first portion of content, etc.), and Slot 2 may be a content delivery slot that is below the fold (e.g., a user has to scroll down to see Slot 2, etc.). The device 110 may request the content for presentation from one or more content delivery servers or publisher servers, that may, in turn, request content for the available content delivery slots at the content. In some instances, a second-price auction may be performed to determine content for which an impression will be served at an available content delivery slot.

In FIG. 1, the device 110 (or another server) may send a request for a first content impression at a first communication 112 to the content delivery server 120. The first content impression may be for Slot 1. The device 110 (or another server) may send a request for a second content impression at a second communication 114 to the content delivery server 120. The second content impression may be for Slot 2. The second communication 114 may be sent by the device 110 or another server at substantially the same time, or within a predetermined time interval, of the first communication 112. For example, the second communication 114 may be sent within 1 second of the first communication 112.

The content delivery server 120 may receive the request for the first content impression from the device 110. The content delivery server 120 may send a first bid request, or a request for a first content identifier at a third communication 122 to one or more content selection servers 130. The content selection server 130 may be one of a number of, or multiple, servers that receive the request for the first content identifier from the content delivery server 120. The request for the first content identifier from the content delivery server 120 may include a request for the content that was requested by the user device and/or a request for third party or additional content. The third communication 122 may be a bid request, or a request for connected entities to bid on the opportunity to present content at a particular content delivery slot. The third communication 122 may include contextual information, such as a website of the content that was requested by the device 110, time and date information, etc., user information, such as a user identifier for the user that is operating or otherwise associated with the device, location information for the content delivery slot (e.g., for videos or audio content, a location could represent a playback position, such as before or after the requested content, etc.), and other information. Available content delivery slots may be locations on digital content at which content can be delivered, such as locations on a webpage, positions within a mobile app (e.g., banner slots, interstitial slots, popup slots, pop-under slots, etc.), or other suitable locations where digital content can be presented. The third communication 122 may also include user attributes for the user, geographic location information, time of day, contextual information for the content around the available content delivery slot, and other contextual information.

Similarly, the content delivery server 120 may receive the request for the second content impression from the device 110, and may send a second bid request or a request for a second content identifier at a fourth communication 124. The fourth communication 124 may be sent to the content selection server 130 and/or a number of other connected servers. The content delivery server 120 may send the third communication 122 and the fourth communication 124 at the same time or at substantially the same time and/or upon receipt from the device 110 or other server. In some instances, the content selection server 130 may receive the third communication 122 and the fourth communication 124 within about 40 milliseconds. In some embodiments, the content selection server 130 may be one or more servers in a fleet of servers or in a distributed computing environment. The third communication 122 may be received by a first server in the fleet, while the fourth communication 124 may be received by a second server in the fleet.

The content selection server 130 may select content and/or a product identifier for presentation to the user at the device 110. In some instances, the content selection server 130 may determine a bid amount for selected content that is sent to the content delivery server 120.

After receiving the third communication 122, one or more computer processors at the content selection server 130 may execute certain operations. The content selection server 130, or a related content selection server in a distributed computing environment (e.g., another server in a fleet, etc.) may execute certain operations after receiving the fourth communication 124, and for other respective communications or bid requests received from the content selection server 130. For example, at a first operation 132, the content selection server 130 may determine a user identifier. The content selection server 130 may determine the user identifier by extracting the user identifier from the data received from the content delivery server 120 at the third communication 122. The content selection server 130 may determine the user identifier based at least in part on information received from the content delivery server 120. In some instances, the content selection server 130 may receive a bid request from the content delivery server 120 and may extract a user identifier, a user account identifier, a user profile identifier, a device identifier, or another user identifier from the bid request.

At a second operation 134, the content selection server 130 may determine eligible content and/or product identifiers. The content selection server 130 may determine one or more eligible content identifiers and/or product identifiers that are eligible for presentation to the user identifier. In some instances, eligibility of product identifiers or content identifiers may be determined based at least in part on targeting criteria associated with the respective product identifiers or content identifiers. In other instances, eligibility of product identifiers or content identifiers may be determined based at least in part on the user's historical interactions. For example, if a user has interacted with a product identifier in the past, such as read product reviews associated with the product identifier, the user may be eligible for presentation of content associated with that product identifier. In some instances, purchase of a competing product may cause the user to be ineligible for certain product identifiers. User interactions may be determined based at least in part on user interaction data for a particular user account or user identifier. For example, user interaction data may include information related to user interactions such as purchases, clicks, views, hovers, likes, shares, comments, and other user interactions. Additional information, such as time of interaction, an elapsed time since interaction, etc., may be included in the user interaction data.

At a third operation 136, the content selection server 130 may determine a ranking for eligible content or product identifiers. For example, based at least in part on the user interaction data and/or targeting criteria for certain content or product identifiers, a ranking may be determined for the eligible content. In one example, if the user is eligible to receive content associated with wireless headphones and content associated with a household cleaning service, and the user has interacted with content associated with wireless headphones five times in the last 24 hours, and has interacted with content associated with the household cleaning service just once in the last week, the content and/or product identifier associated with the wireless headphones may be ranked higher than the content or product identifier for the household cleaning service because the user may likely be more interested in the wireless headphones, and content associated with the wireless headphones may therefore be more relevant to the user. Rankings may indicate a level of relevance to a user, a probability of conversion or interaction for the user, an expected revenue from presentation of the content, and/or other information. In some embodiments, rankings of content or product identifiers may be determined based at least in part on the number of times the user interacted with a product or content identifier. Other factors that may be used to determine ranking may include an expected cost of presenting content related to a particular product or content identifier, an expected revenue for presenting content related to a particular product or content, a probability that the user will interact with content that includes or is related to the product or content, and other factors.

In some embodiments, rankings may be based at least in part on a ranking score, such as a probability of conversion or a probability of action for specific users. Probability of conversion or probability of action may be the probability that serving one impression to the user will lead to a conversion or a click or other desired action. Probabilities may be determined, for example, by logistic regressions, redundancy models, or other models. The models used to determine probability may consider several inputs, including user-specific information (e.g., demographic, purchase history, etc.), context information (e.g., time of day, website content, keywords, etc.). In some embodiments, the content selection server 130 may pre-rank eligible product and/or content identifiers for users, so as to reduce computations at runtime.

At a fourth operation 138, an impression counter value may be determined. The impression counter value may be an impression counter value for the user identifier and may indicate a number of content impressions that were served, or that were likely served, to a device associated with the user identifier over a particular period of time. For example, in FIG. 1, an impression counter 140 for the user identifier may have an impression counter value of "00" which may indicate that the user identifier has not been served a content impression over a particular time period, such as the preceding five seconds or another time interval. The impression counter value may be used in conjunction with the ranking of eligible content or product identifiers to select content for presentation to the user. In some embodiments, the impression counter value may be updated by one or more content selection servers in a fleet of servers, such that if a bid request is received for the user identifier by another server in the fleet that did not process a bid request for the user identifier, the other server may determine that an impression has already been served to the user identifier. As a result, the impression counter 140 may be a shared resource among one or more content selection servers 130, such as a fleet of content selection servers. The impression counter 140 may be read, modified, and/or accessed by one or more computer systems. In some embodiments, a series of timestamps may be included in the impression counter data, where a first impression timestamp may be used as a seed value for randomization of product identifiers and/or selection of content.

In some embodiments, the content selection server 130 may generate bid amounts in response to bid requests from the content delivery server 120, and may not determine until a later point in time whether an impression was actually served and/or whether the bid amount was a winning bid amount. Accordingly, in some instances, the impression counter value may represent a number of impressions that may have likely been served to the user identifier. In such embodiments, a probability that a bid amount is a winning bid amount, or a probability distribution for multiple bid amounts over time, may be determined and used to determine an estimated number of impressions that may likely have been presented to the user. The impression counter value may therefore be an estimation. In other embodiments, the impression counter value may be incremented upwards every time a bid amount or a response to a bid request is submitted, thereby assuming that the bid amount is a winning bid and/or that an impression will be served. In some embodiments, the impression counter value may be increased before receiving confirmation that an impression was presented at the first content delivery slot. Therefore, the impression counter value may represent a maximum number of impressions that could have been presented to a specific user.

At a fifth operation 142, the content selection server 130 may select content using the impression counter value. For example, the content selection server 130 may determine that the impression counter value is 00 at operation 138, and may therefore select a first-ranked or a top-ranked product identifier or content identifier for the user, since the user has not been presented with an impression within a certain timeframe, and there is no risk of duplicate presentation of impressions. Accordingly, the content selection server 130 may determine that an eligible content ranking 144 indicates that Product 236 is a top-ranked content or product identifier, and may therefore select Product 236 for presentation. If the impression counter value had been 01, the content selection server 130 may have selected the second-ranked content identifier Product 3669 instead of Product 236, because the Product 236 content may already have been presented to the user since it is a top-ranked product identifier. The ranking of content and/or product identifiers may remain constant during the timeframe the impression counter is counting and/or until the impression counter value resets.

At a sixth operation 146, the content selection server 130 may determine a bid amount for the selected content. For example, a bid amount for content associated with Product 236 may be determined. The bid amount may be determined based at least in part on a number of factors, such as an expected revenue from presentation of the impression, a probability of conversion, and other factors. In some embodiments, the bid amount may be a function of a ranking score associated with the particular content or product identifier.

At a seventh operation 148, the content selection server 130 may generate a response to the request for the first content identifier. In some embodiments, the response to the request may include the bid amount, the content and/or product identifier, and/or the content data.

At an eighth operation 150, the content selection server 130 may increment the impression counter value. For example, the impression counter value 152 may be incremented to 01 instead of 00, so as to indicate that one response to a bid request has been generated by the content selection server 130. Therefore, the same content or product identifier (e.g., Product 236) will not be selected in response to another bid request, such as the fourth communication 124.

At a fifth communication 154, the content selection server 130 may send a first content identifier for the selected content, or a product identifier for a selected product identifier, in response to the first request (e.g., the third communication 122) to the content delivery server 120. In some instances, the content selection server 130 may also send a bid amount for presentation of an impression of the content at the content delivery slot. The content delivery server 120 may receive the first response (e.g., the fifth communication 154) from the content selection server 130, and at optional sixth communication 156, the content delivery server 120 may determine that an impression of the first content identifier is to be presented at Slot 1 at the device 110. Accordingly, an impression 158 of the first content identifier, which may relate to Atlanta Falcons gear, as shown in FIG. 1, may be presented at Slot 1.

The content selection server 130 or another server in the fleet of content selection servers may implement some or all of the same operations to determine or select content for Slot 2 in response to the second bid request or the fourth communication 124. Accordingly, at a seventh communication 160, the content selection server 130 or a related server may send a second content identifier in response to the second request or the fourth communication 124 to the content delivery server 120. The content delivery server 120 may receive the second response or the seventh communication 160, and at optional eighth communication 162, the content delivery server 120 may determine that an impression of the second content identifier is to be presented at Slot 2 at the device 110. Accordingly, an impression 164 of the second content identifier, which may relate to Hawaii tourism, as shown in FIG. 1, may be presented at Slot 2. In some instances, the content delivery server 120 may conduct a second price auction to determine which content to send to the device 110.

Accordingly, the same or similar content, or duplicate impressions, may be prevented from presentation to a user at the same time or within a short timeframe. The impression counter may be used to determine a number of impressions that may or may likely have been presented to a user, and can be used for selection of content that has not yet been presented to a particular user.

The first content and second content may be presented at a display or via speakers of the device 110. In some embodiments, the device 110 may be configured to present audio, such as music, news, weather information, or other audible content to a user. Available content slots may allow for presentation of audio content in between segments of audio presented at the device 110. For example, the user may be streaming music or other audio, and at pauses or breaks in between the music, audio content may be presented. The device 110 may be configured to present audible content and may be, for example, a device such as a television, a laptop computer, a tablet, a computer monitor, a speaker-type device, augmented reality or virtual reality glasses or devices, or another device configured to output audio. The device 110 may include or may utilize a speech interface device or other audio device, such as one or more speakers, that are capable of playing or presenting various types of audio. The device 110 may include one or more microphones to detect ambient sound. The device 110 may operate in conjunction with and/or under the control of a remote network-based speech command service that is configured to receive audio; to recognize speech in the audio; and to perform functions or services in response to the recognized speech, or to generate audible dialog or audible content in response to recognized speech. The device 110 may have one or more microphones and one or more audio speakers or transducers to facilitate speech interactions with the user. The device 110 may receive spoken expressions or utterances from the user and may provide services, perform actions, or facilitate conversation or dialogue in response to the spoken utterances. For example, the user may speak an utterance with a verbal request. In some embodiments, the device 110 may only be activated to listen upon determining that the user has spoken a predefined wake or trigger expression (e.g., "Awake" or "Alexa," etc.), that may be followed by an utterance (e.g., "I'd like to order a taxi."). Provided services may include performing actions or activities, rendering media, obtaining and/or providing information, providing information via generated or synthesized speech via the device 110, initiating Internet-based services on behalf of the user, performing actions relating to home automation and control, and so forth.

The systems, methods, computer-readable media, techniques, and methodologies for preventing duplicate content selection for digital presentation may result in optimal and/or improved selection of content or product identifiers for presentation to specific users. In some embodiments, impression counters may be sued to determine how many impressions have been presented, or may have been presented, to a particular user. Impression counter values may be used to select content in real-time, while preventing selection of content that may no longer be relevant to a user because, for example, the user has already been presented with an impression or with similar content.

Example embodiments of the disclosure provide a number of technical features or technical effects. For example, in accordance with example embodiments of the disclosure, certain embodiments of the disclosure may generate impression counters that can be accessed and/or updated by a number of servers in a distributed computing environment. As a result, content or product identifiers from catalogs or databases of tens of millions of products can be selected in a relatively short time frame, due to increased computing efficiency and improved use of computer resources. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
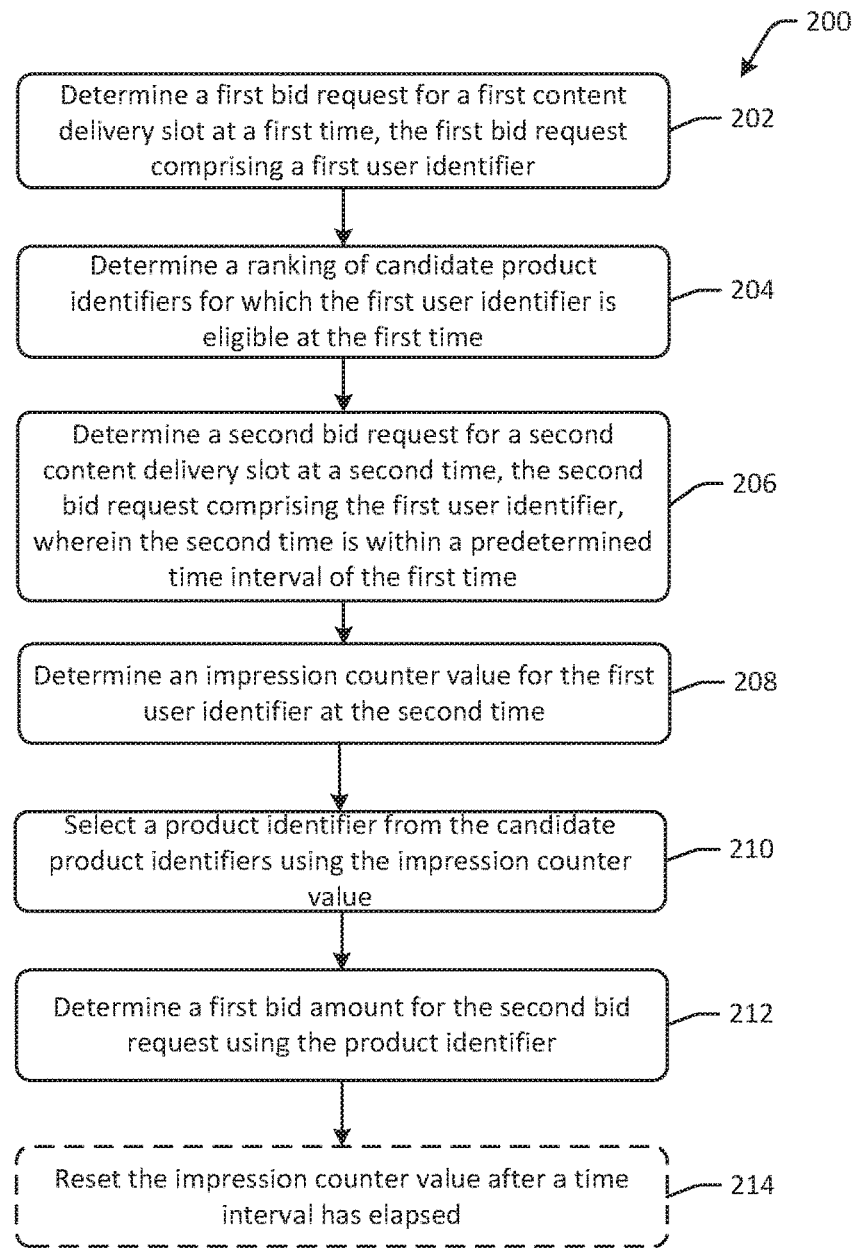
FIG. 2 is an example process flow diagram for preventing duplicate content selection for digital presentation in accordance with one or more embodiments of the disclosure.

Referring to FIG. 2, an example process flow 200 for preventing duplicate content selection for digital presentation in accordance with one or more embodiments of the disclosure is depicted. Although certain operations are illustrated as occurring separately in FIG. 2, some or all of the operations may occur concurrently or partially concurrently across one or more computer systems. One or more operations may be optional in FIG. 2.

At block 202 of the process flow 200, a first bid request for a first content delivery slot at a first time may be determined, the first bid request including a first user identifier. For example, the bid request may be for a particular content slot, such as a digital or audio content slot, and may include a user identifier indicative of a user to which an impression of content may be presented. In one embodiment, computer-executable instructions of one or more content selection module(s) stored at a server may be executed to receive a bid request or a request for content. A user identifier may be extracted from the bid request, and a time at which the bid request was received and/or at which a response to the bid request was sent may be stored. In some embodiments, a timestamp may be generated or determined that is associated with a time that the first bid request was received. The timestamp may be associated with content or product identifier rankings at the timestamp, and can be used to determine rankings at particular times.

At block 204 of the process flow 200, a ranking of candidate product identifiers for which the first user identifier is eligible at the first time may be determined. The ranking may indicate that a first product identifier is ranked higher than a second product identifier for the user. For example, computer-executable instructions of one or more content selection module(s) stored at a server may be executed to determine candidate content and/or candidate product identifiers that are eligible for presentation to the user identifier. Eligibility may be based at least in part on targeting criteria for particular content or product identifiers and/or historical user interactions. In some embodiments, a user interaction history for a particular user may be determined in response to a bid request or other communication. The user interaction history may indicate, in one example, that the user interacted with a particular product. Based at least in part on the user interaction data, a set of interacted items may be determined for the user account. The set of interacted items may include the first product identifier, which may be for a first item that was interacted with a first number of times, and a second product identifier that was interacted with a second number of times. The second number of times may be less than the first number of times. The second product identifier may therefore be ranked lower than the first product identifier in one example. The ranking may be held constant during a particular time interval that corresponds to a reset time period of the impression counter value. The ranking may be determined or associated with the timestamp at which the first bid request was received.

In some embodiments, a set of eligible product identifiers may be determined instead of, or in addition to, a set of candidate content. The set of candidate content may be content or products for presentation at a content delivery slot. Candidate content identifiers or candidate product identifiers may be determined, for example, based at least in part on the user interaction data. For example, computer-executable instructions of one or more content selection module(s) stored at a server may be executed to determine candidate content identifiers and/or product identifiers for a user account. Candidate content identifiers and/or product identifiers may be determined based at least in part on targeting criteria for the respective candidate content identifiers and/or product identifiers, in some instances. In other instances, candidate content identifiers and/or product identifiers may be determined based at least in part on a number of times the user interacted with particular content and/or particular product identifiers or related information, previous purchases, and other factors.

At block 206 of the process flow 200, a second bid request for a second content delivery slot at a second time may be determined, the second bid request including the first user identifier, where the second time is within a predetermined time interval of the first time. For example, computer-executable instructions of one or more content selection module(s) stored at a server may be executed to receive a second bid request for a second content delivery slot. The second content delivery slot may be at the same or at a different webpage, user interface, or display location as the first content delivery slot. The second bid request may be received at the same time, at substantially the same time, or within a predetermined time interval of the first bid request. The predetermined time interval may correspond to a reset time interval of an impression counter value for the user identifier. For example, the predetermined time interval may be about 5 seconds, after which the impression counter value for the user identifier may be reset. Other embodiments may have different predetermined time intervals. The ranking at the timestamp where the first bid request was received may be used to determine which content to select in response to the second bid request.

At block 208 of the process flow 200, an impression counter value for the first user identifier at the second time may be determined. The impression counter value may be for a specific user identifier, a group of user identifiers, a specific device, a group of devices, or for another set of user accounts or profiles. The impression counter value may be indicative of a number of impressions that may have been served to a particular group of users or a particular user, a number of responses to bid requests that have been submitted, an estimated number of winning bid amounts and/or impressions served to a particular user, or another indication of impressions for a particular user identifier over a certain time interval.

At block 210 of the process flow 200, a product identifier from the candidate product identifiers may be selected using the impression counter value. For example, if the impression counter value has a value of 2, then a second-ranked or a third-ranked content identifier or product identifier may be selected for presentation to the user and/or for which to generate a bid amount for. For example, computer-executable instructions of one or more content selection module(s) stored at a server may be executed to select a product identifier or content identifier from the candidate content or product identifiers based at least in part on the impression counter value. The selected content may have a ranking that corresponds to the impression counter value if the impression counter value has a baseline of 1, or the selected content may have a ranking that is greater than the impression counter value if the impression counter value has a baseline of 0.

At block 212 of the process flow 200, a first bid amount for the second bid request may be determined using the product identifier. The first bid amount may be determined based at least in part on information associated with the bid request, such as user information, device information, time of day information, and other factors. For example, computer-executable instructions of one or more bidding module(s) stored at a server may be executed to determine a bid amount for the respective bid requests based at least in part on the selected product or content identifier.

At optional block 214, the impression counter value may be reset after a time interval has been reset. For example, computer-executable instructions of one or more timing module(s) stored at a server may be executed to reset an impression counter value periodically. The time period at which the impression counter value is reset may correspond to a time after which the user can be presented with the same content or product identifier again. The time period may therefore be specific to certain users, groups of users, or may be consistent across all users. The time period may be, for example, 5 seconds, 5 minutes, 24 hours, or another time period.

Figure 3:
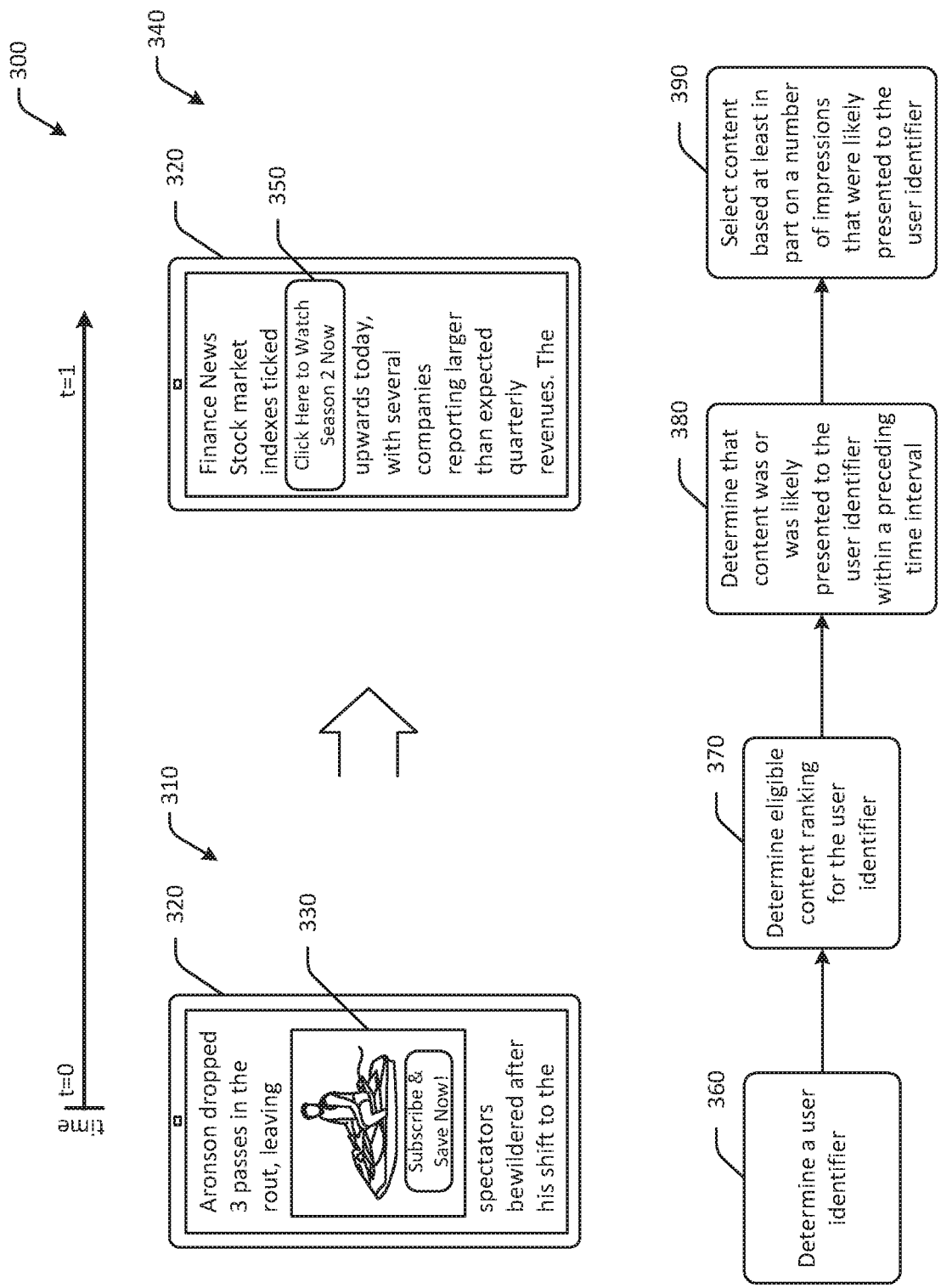
FIG. 3 is a hybrid system and process diagram illustrating example user interfaces over time and an example process flow diagram for selecting content using a probability of presentation in accordance with one or more embodiments of the disclosure.

FIG. 3 depicts example user interfaces 300 over time and an example process flow for selecting content using a probability of presentation in accordance with one or more embodiments of the disclosure. The process flow 300 may be used, in some embodiments, by one or more content selection servers to select content for presentation to a particular user. Content selected as a result of execution of some or all of the operations of the process flow in FIG. 3 may have an increased likelihood of engaging the user, an increased relevance to a particular user, and/or an increased likelihood of user interaction with the content. Content may include a product identifier that is presented as part of, or otherwise associated with, the content.

At a first user interface 310 at time t=0, a device 320 may be used to present news information. A first content delivery slot 330 in the news information may be used to present an impression of content related to jet skis. Because the content related to jet skis was presented at time t=0, the same content or similar content may not be desirable to present to the user again at another content slot in the same news information, or at another location within a certain amount of time. For example, a second user interface 340 may be presented at the device 320 at a second time t=1. The second user interface 340 may have financial news and may have a second content delivery slot 350 that is used to present television programming content (e.g., watch season 2 now, etc.). Although the second user interface 340 is at a different webpage or in a different application, the same jet ski content at the first content delivery slot 330 may be prevented from being presented to the user within a certain amount of time.

In the process flow illustrated at FIG. 3, at block 360, a user identifier may be determined. In the example of FIG. 3, the user identifier may be a device profile or user account associated with the device 320.

At block 370, an eligible content ranking for the user identifier may be determined. The eligible content ranking may be based at least in part on the user interaction history for the user identifier, targeting criteria, or other factors.

At block 380, it may be determined that content was or was likely presented to the user identifier within a preceding time interval. This determination may be made based at least in part on an impression counter value, a probability that a bid amount was a winning bid amount, a number of bid requests that have been received and/or responded to, a value of bid amounts that have been generated for bid requests associated with the user identifier, and/or other factors.

At block 390, content may be selected based at least in part on a number of impressions that were likely presented to the user identifier. For example, a probability distribution may be generated using a number of responses to bid requests that have been submitted for a user identifier and the respective bid amounts. The probability distribution may indicate that there have likely been 5 impressions served to the user out of a possible 12 bid request responses. Accordingly, the sixth-ranked content may be selected for presentation to the user identifier instead of the thirteenth-ranked content. In the example of FIG. 3, the jet ski content may be fifth-ranked content, while the television content may be sixth-ranked content.

Figure 4:
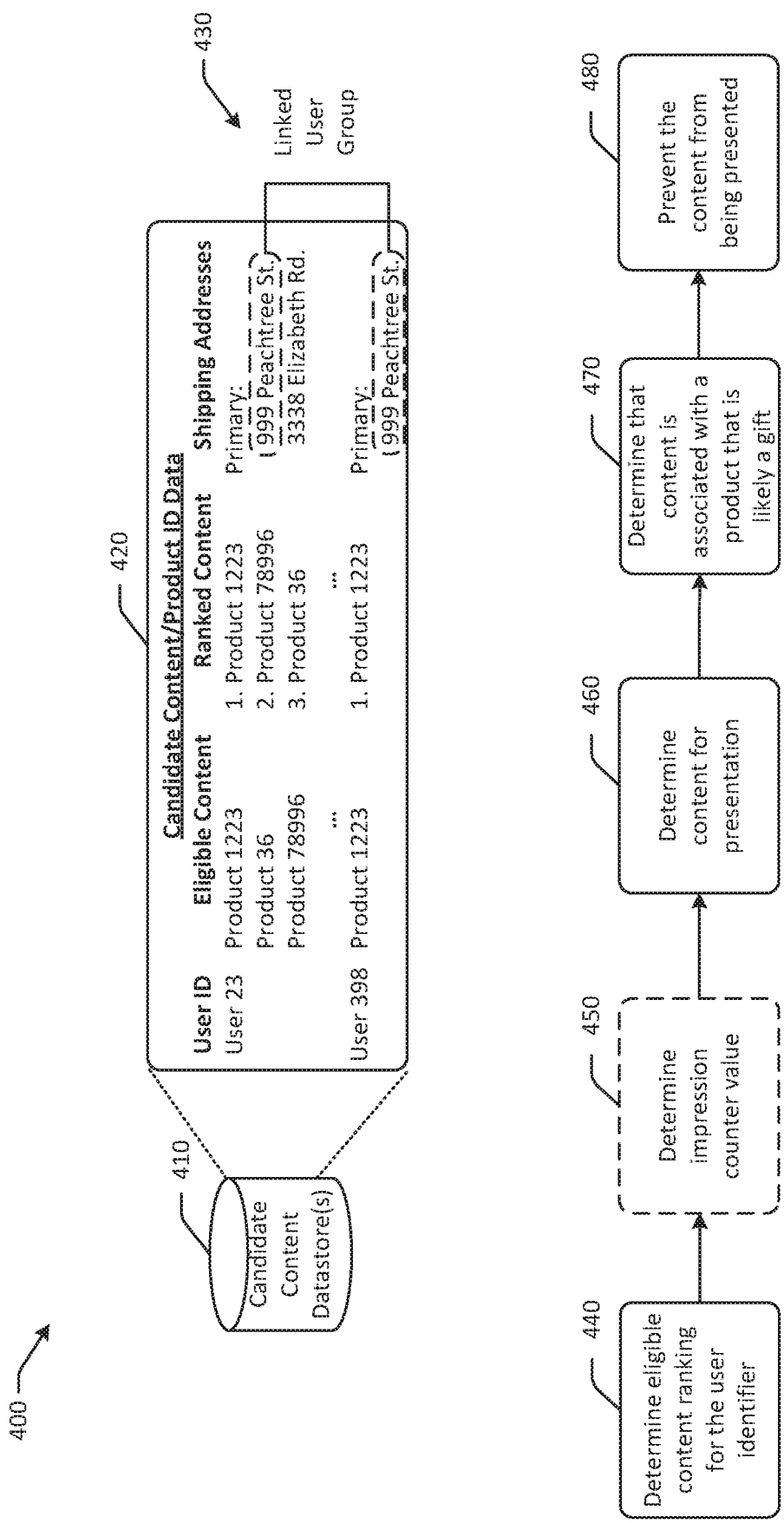
FIG. 4 is a hybrid system and process diagram illustrating a schematic drawing of an example datastore with candidate content data and an example process flow diagram for preventing duplicate content selection for digital presentation in accordance with one or more embodiments of the disclosure.

FIG. 4 depicts an example datastore 400 and an example process flow diagram for preventing duplicate content selection for digital presentation in accordance with one or more embodiments of the disclosure. In particular, FIG. 4 includes one or more candidate content datastore(s) 410. The candidate content datastore(s) 410 may include candidate content and/or candidate product identifier data 420 for one or more users. The candidate content data 420 may be determined for respective users and may be based at least in part on targeting criteria associated with the content and/or user interaction data for the particular identifier. In some embodiments, the candidate content data 420 may include pre-ranked content for a particular user. The candidate content data 420 may also include one or more shipping addresses, such as primary shipping addresses, that are associated with particular user accounts. The shipping addresses may be used to determine groups of users that may live together or may otherwise be related, so as to propagate content impression restrictions and/or impression counter values across multiple linked or related users. The candidate content datastore(s) 410 may include candidate content and/or product identifier data for content or product identifiers for which the user is eligible. For example, the user may satisfy targeting criteria for the content, or may have interacted with the product identifier in the past.

For example, the candidate content data 420 may include eligible content for a first user, User 23. The eligible content may include a number of product or content identifiers. The candidate content data 420 may include ranked content, as well as shipping addresses. Because the first user, User 23, and a second user, User 398, have the same primary shipping address, the first user and the second user may be linked as a user group, and the impression counter value for User 23 may be propagated or shared with the impression counter value for User 398, or vice versa. Eligible content and/or content rankings may also be shared across user groups.

The process flow illustrated in FIG. 4 may be implemented by one or more content selection servers so as to prevent spoiling a gift for another user by presenting content associated with a potential gift to another user that is linked to a first user. At a first block 440, a ranking of eligible content may be determined for a first user identifier. At an optional second block 450, an impression counter value may be determined. The impression counter value may be determined for a second user identifier that is related to, linked to, or otherwise associated with the first user identifier. At block 460, content for presentation may be determined. For example, content that corresponds to the impression counter value, or top-ranked content, may be determined. At block 470, it may be determined that the content is associated with a product that is likely a gift. For example, the content selection server may determine a probability that certain products are gifts based at least in part on a particular user's demographics, purchase history, preferences, or other user-specific factors, as well as aggregate gifting trends (e.g., certain products such as flowers may generally be gifted by other users, etc.). In one example, if a female user is looking at men's watches, then the content selection server may determine that the men's watch is likely a gift, or has a probability of being a gift that is greater than a certain threshold. At block 480, the content that is associated with a product that is likely a gift may be prevented from being presented. Other content may be selected, or a default or fallback image may be presented instead. Accordingly, if a linked male user is using the device or is browsing content, content related to the men's watch may be prevented from presentation, so as to avoid spoiling the potential gift from the female user or the wife.

Figure 5:
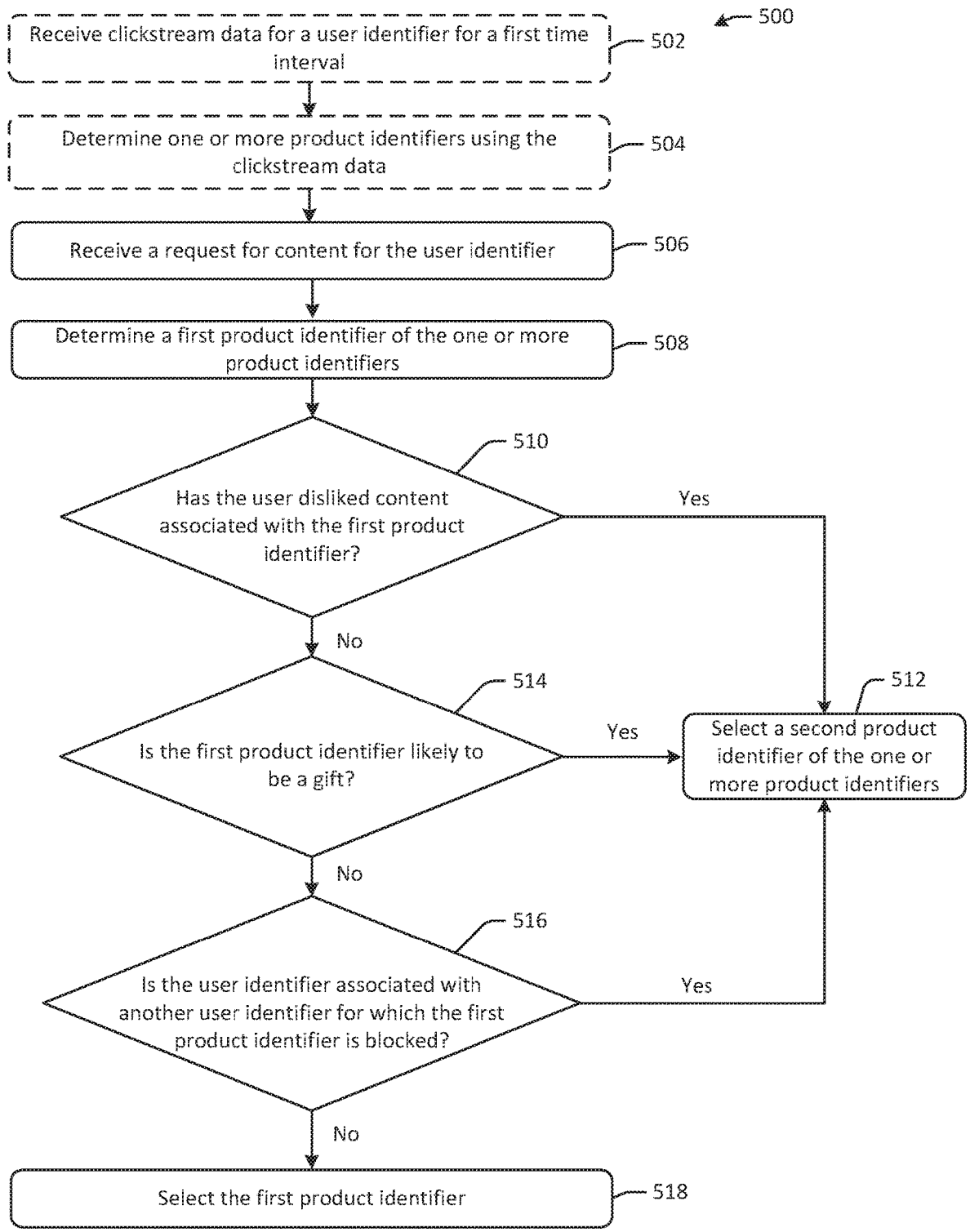
FIG. 5 is an example process flow diagram for selecting content based at least in part on dislike events, gifts, and related users in accordance with one or more embodiments of the disclosure.

FIG. 5 is an example process flow 500 for selecting content based at least in part on dislike events, gifts, and related users in accordance with one or more embodiments of the disclosure. FIG. 5 may be used to determine whether certain content should be selected or prevented from selection for a particular user, and may be based at least in part on determinations associated with related users.

At optional block 502, clickstream data for a user identifier for a first time interval may be determined or received. For example, clickstream data during a first time interval, such as the last 24 hours, the last 30 days, in real-time, etc., may be received from another server, or may be determined from one or more datastores. In one embodiment, a user account may be determined using a user identifier.

At optional block 504, one or more product identifiers may be determined using at least a portion of the clickstream data. The one or more product identifiers may be product identifiers that the user account has interacted with, or for which a purchase event is associated with. In one embodiment, a set of product identifiers of items that a user has interacted with may be determined using the user account. The set of items may include, for example, a first product identifier for a first item interacted with during a first predetermined time interval, such as during the last 12 months. In some embodiments, a first number of user interactions with the first product identifier may be determined using the clickstream data, and a second number of user interactions with a second product identifier may be determined using the clickstream data. Rankings of the first product identifier and the second product identifier may be determined based at least in part on the first number and the second number.

Clickstream data may be processed so as to avoid counting user interactions with products that occur during a grace period, such as shortly before or after (e.g., 1 hour, etc.) a purchase event of a product. For example, a user may buy a product and then return to the product page for information. Such an event may be ignored or treated as neutral data in the clickstream data because it may not be indicative of a user's intent to purchase.

At block 506, a request for content may be received for the user identifier. For example, a content selection server may receive a request for content from a content delivery server. The request for content may include the user identifier. The content selection server may receive a bid request for a bid amount, a content identifier, a product identifier, and/or other information. The content selection server may extract user information, such as the user identifier, from the request.

At block 508, a first product identifier of the one or more product identifiers may be determined. The first product identifier may be determined based at least in part on the clickstream data or user interaction data for the user identifier. The first product identifier may be a top-ranked product or content identifier and/or may be determined based at least in part on an impression counter value for the user identifier.

Figure 7:
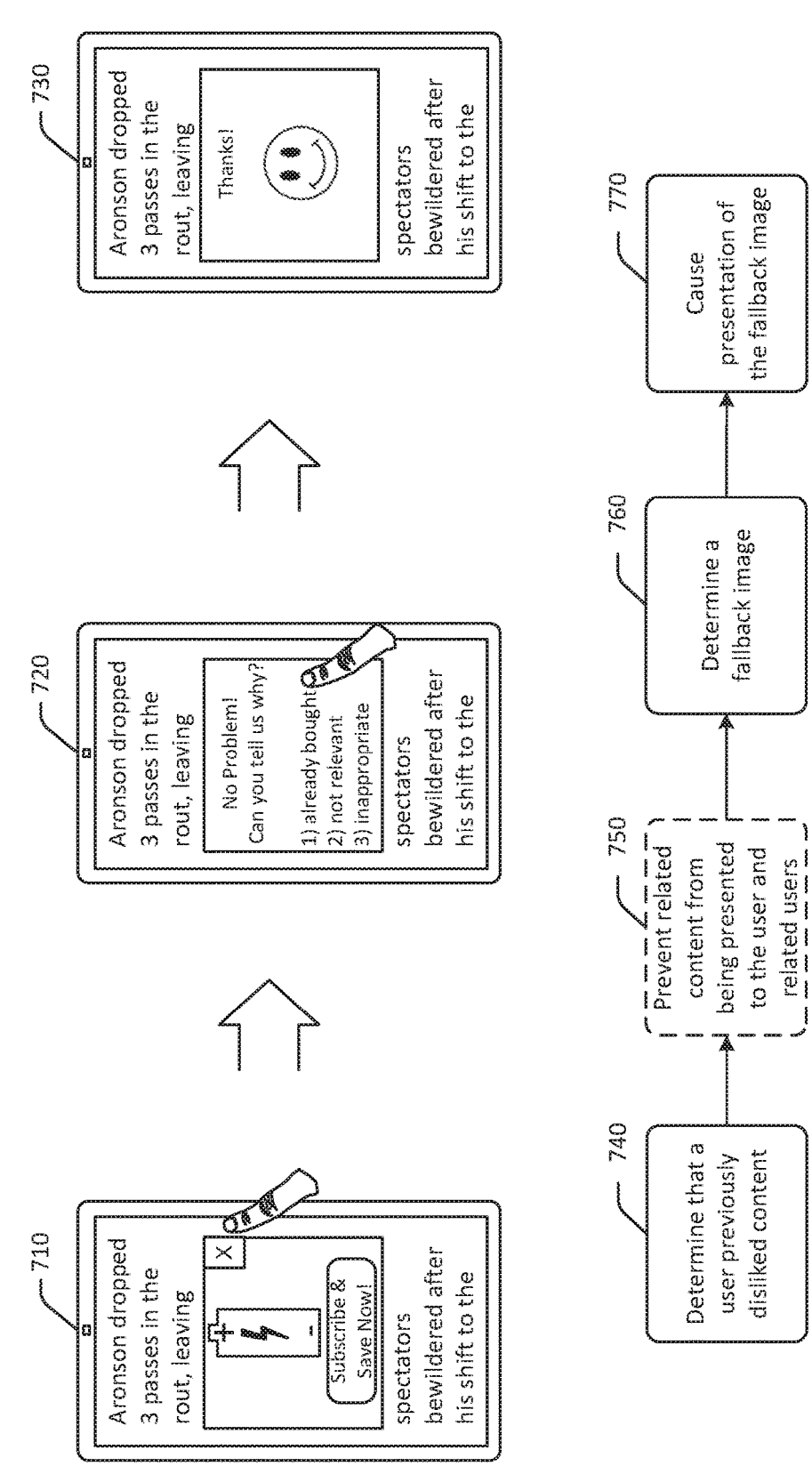
FIG. 7 is a hybrid system and process diagram illustrating a dislike event in accordance with one or more embodiments of the disclosure.

At determination block 510, it may be determined whether the user has disliked content associated with the first product identifier. For example, the clickstream data, user preference data, user dislike data, or other data associated with the user account may be analyzed to determine if the user has previously disliked content associated with the first product identifier. The user may cause a dislike event to occur for certain content, for example, by clicking an "X" on certain content and/or otherwise indicating that the user does not like certain content. A reason may be provided by the user, as illustrated in FIG. 7.

If it is determined at determination block 510 that the user has disliked content associated with the first product identifier, the process flow 500 may proceed to block 512, at which a second product identifier of the one or more product identifiers may be selected. Accordingly, the user will not be presented with content that is related to other content that the user has previously disliked.

If it is determined at determination block 510 that the user has not disliked content associated with the first product identifier and/or there is no dislike event associated with the first product identifier, the process flow 500 may proceed to determination block 514.

At determination block 514, it may be determined whether the first product identifier is likely to be a gift. For example, a determination may be made as to a probability that the first product identifier is a gift based at least in part on user attributes of the user (e.g., gender, age, location, shipping address, etc.), aggregate user gifting rates for the particular product identifier, and other factors to determine whether the first product identifier is likely a gift. In some embodiments, the user may indicate that the product is a gift, for example, by selecting a different shipping address and/or shipping name, by selecting a gift wrap option, by adding a gift message, and/or by other indications.

Certain embodiments may automatically prevent certain categories of product identifiers from presentation at certain times due to a likelihood the product identifier may be a gift, such as children's toys around a Christmas holiday. Some embodiments may determine a propensity for certain product categories to be gifts for particular users and/or predict that a user will send a product identifier to a different address or check a gift checkbox at checkout. Some embodiments may determine that a propensity to purchase the first product identifier for the first user identifier is below a threshold value. The propensity to purchase may be based at least in part on user attributes (e.g., a fifty year old man may have a low propensity to purchase women's jeans, etc.). If the propensity to purchase a particular item or a product in a certain category is below a threshold level, the product may be determined to be a gift.

If it is determined at determination block 514 that the first product identifier is likely to be a gift, the process flow 500 may proceed to block 512, at which a second product identifier of the one or more product identifiers may be selected. Accordingly, content related to the potential gift will be prevented from selection, thereby avoiding spoiling a surprise or the gift.

If it is determined at determination block 514 that the product is not likely to be a gift, the process flow 500 may proceed to determination block 516.

At determination block 516, it may be determined whether the user identifier is associated with another user identifier for which the first product identifier is blocked. For example, two users of the same household or with otherwise linked accounts, or two linked devices may be prevented from being presented with duplicate content over short periods of time. In addition, content related to potential gifts for other people or other household members may be prevented from selection. Further, a dislike event associated with one user may be propagated to other related users.

If it is determined at determination block 516 that the user identifier is associated with another user identifier for which the product identifier is blocked, the process flow 500 may proceed to block 512, at which a second product identifier of the one or more product identifiers may be selected. Accordingly, the user will not be presented with content that has been blocked for another user (e.g., disliked by another user, a gift, etc.). Content or product identifiers that are determined to be eligible for a particular user may be propagated as eligible for users that are related to the user, such as household members or other related users. Related users may be determined, in one example, by identifying user accounts with the same shipping address, linked online membership logins, etc. Similarly, content that is determined to be ineligible for a user may be propagated across related users.

If it is determined at determination block 516 that the user is not associated with another user identifier for which the product identifier is blocked, the process flow 500 may proceed to block 518.

At block 518, the first product identifier may be selected. For example, content associated with the first product identifier or the first product identifier may be selected. The content selection server may select content related to the first product identifier for which to generate a bid amount and/or for which to present an impression.

Figure 6:
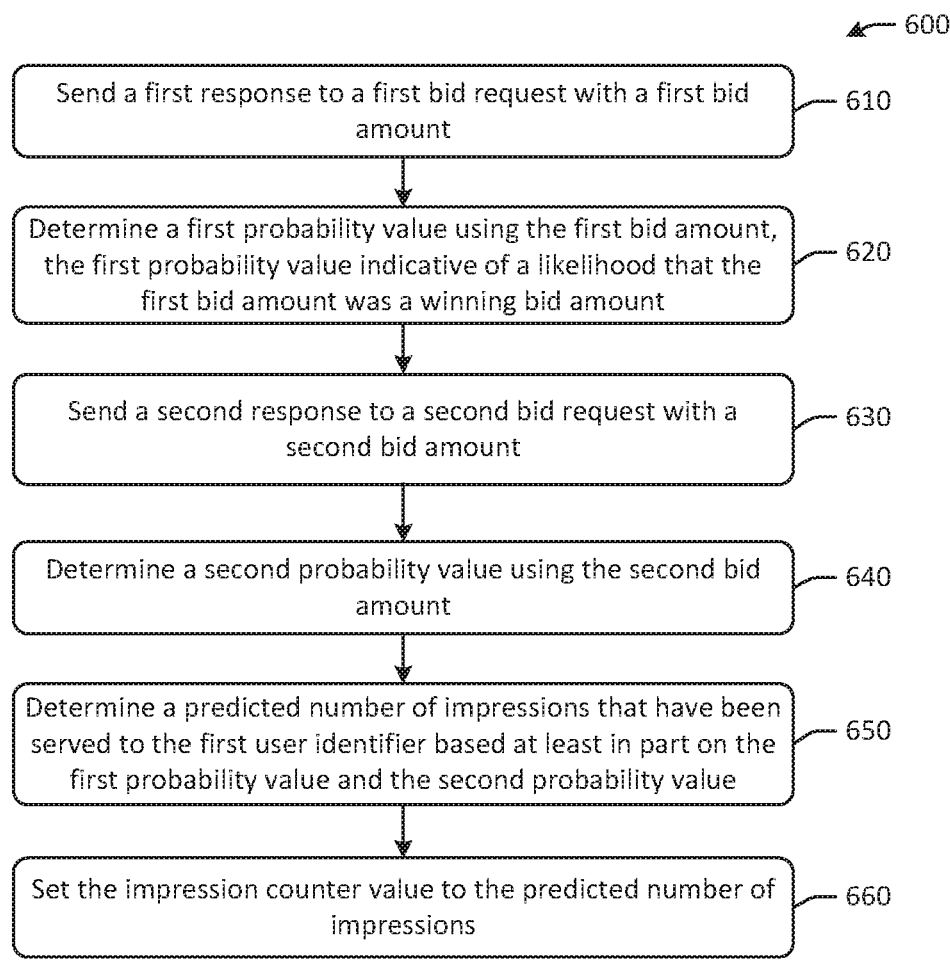
FIG. 6 is an example process flow diagram for determining a predicted number of impressions that have been served in accordance with one or more embodiments of the disclosure.

FIG. 6 depicts an example process flow 600 for determining a predicted number of impressions that have been served in accordance with one or more embodiments of the disclosure. Although certain operations are illustrated as occurring separately in FIG. 6, some or all of the operations may occur concurrently or partially concurrently across one or more computer systems. One or more operations may be optional in FIG. 6.

At block 610 of the process flow 600, a first response to a first bid request with a first bid amount may be sent. For example, computer-executable instructions of one or more content selection module(s) stored at a server may be executed to select content and generate a bid amount for a first content identifier in response to the first bid request.

At block 620 of the process flow 600, a first probability value may be determined using the first bid amount, the first probability value indicative of a likelihood that the first bid amount was a winning bid amount. For example, computer-executable instructions of one or more probability determination module(s) stored at a server may be executed to determine a probability that a certain bid amount will be a winning bid amount before receiving a winning bid notification and/or an impression notification.

At block 630 of the process flow 600, a second response to a second bid request with a second bid amount may be sent. For example, computer-executable instructions of one or more content selection module(s) stored at a server may be executed to select content and generate a bid amount for a second content identifier in response to the first bid request.

At block 640 of the process flow 600, a second probability value may be determined using the second bid amount, the second probability value indicative of a likelihood that the second bid amount was a winning bid amount. For example, computer-executable instructions of one or more probability determination module(s) stored at a server may be executed to determine a probability that a certain bid amount will be a winning bid amount before receiving a winning bid notification and/or an impression notification.

The first probability value and the second probability value may be used to determine a likelihood that the associated bid amount was a winning bid amount. For example, a probability value at or above a certain threshold may be determined to likely be a winning bid, while probability values under the threshold may be determined to likely be a losing bid. At block 650 of the process flow 600, a predicted number of impressions that have been served to the first user identifier may be determined based at least in part on the first probability value and the second probability value. For example, computer-executable instructions of one or more probability determination module(s) stored at a server may be executed to determine a predicted number of impressions that have been served to the first user identifier. The predicted number may be based at least in part on a probability distribution that is generated using the first probability value and the second probability value. In some instances, the probability distribution may be used to determine whether a bid amount is likely to be a winning or a losing bid.

At block 660 of the process flow 600, the impression counter value for the user identifier may be set to the predicted number of impressions. Accordingly, subsequent bid requests may be processed using the same determinations and/or content for subsequent bid requests and may be selected based at least in part on the predicted number of impressions until the impression counter value is reset.

FIG. 7 depicts a hybrid system and process diagram illustrating a dislike event 700 in accordance with one or more embodiments of the disclosure. At a first user interface 710, a user may be presented with content for a product identifier, such as a battery. The content may include a selectable option, such as an "X" that triggers a dislike event to be associated with the content. In the example of FIG. 7, the user may select the "X." A second user interface 720 may be presented after the user selects the "X." The second user interface 720 may include a number of selectable options that allows the user to indicate why the user disliked the content. For example, the user may be able to indicate that the user has already bought the item, the item is not relevant to the user, the item or content was inappropriate, and the like. At a third user interface 730, a confirmation may be presented to the user indicating that user feedback was received. The dislike event may be associated with the user account and/or related user accounts, and the content and related content may be prevented from selection for future impressions for the user and/or related users. Content associated with a dislike event may be blocked from selection for presentation to the user and/or to users that are related to the user (e.g., household users, etc.).

In the example process flow illustrated at FIG. 7, at block 740, a content selection server may determine that a user previously disliked content. At optional block 750, related content may be prevented from being presented to the user and related users. At block 760, a fallback image may be determined. At block 770, presentation of the fallback image may be caused. For example, if an impression of content that was disliked by the user is to be presented, a fallback image, such as the image at the third user interface 730, may be presented instead. The determinations of the process flow in FIG. 7 may be performed partially or fully by a content selection server or a client-side device. Therefore, even if an impression for disliked content is to be presented to a user, the content can be replaced with a fallback image rather than presenting the disliked content, and can still make use of a content delivery slot. Certain embodiments may cause the fallback image to be rendered at the content delivery slot instead of an image associated with the product identifier that was previously disliked.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
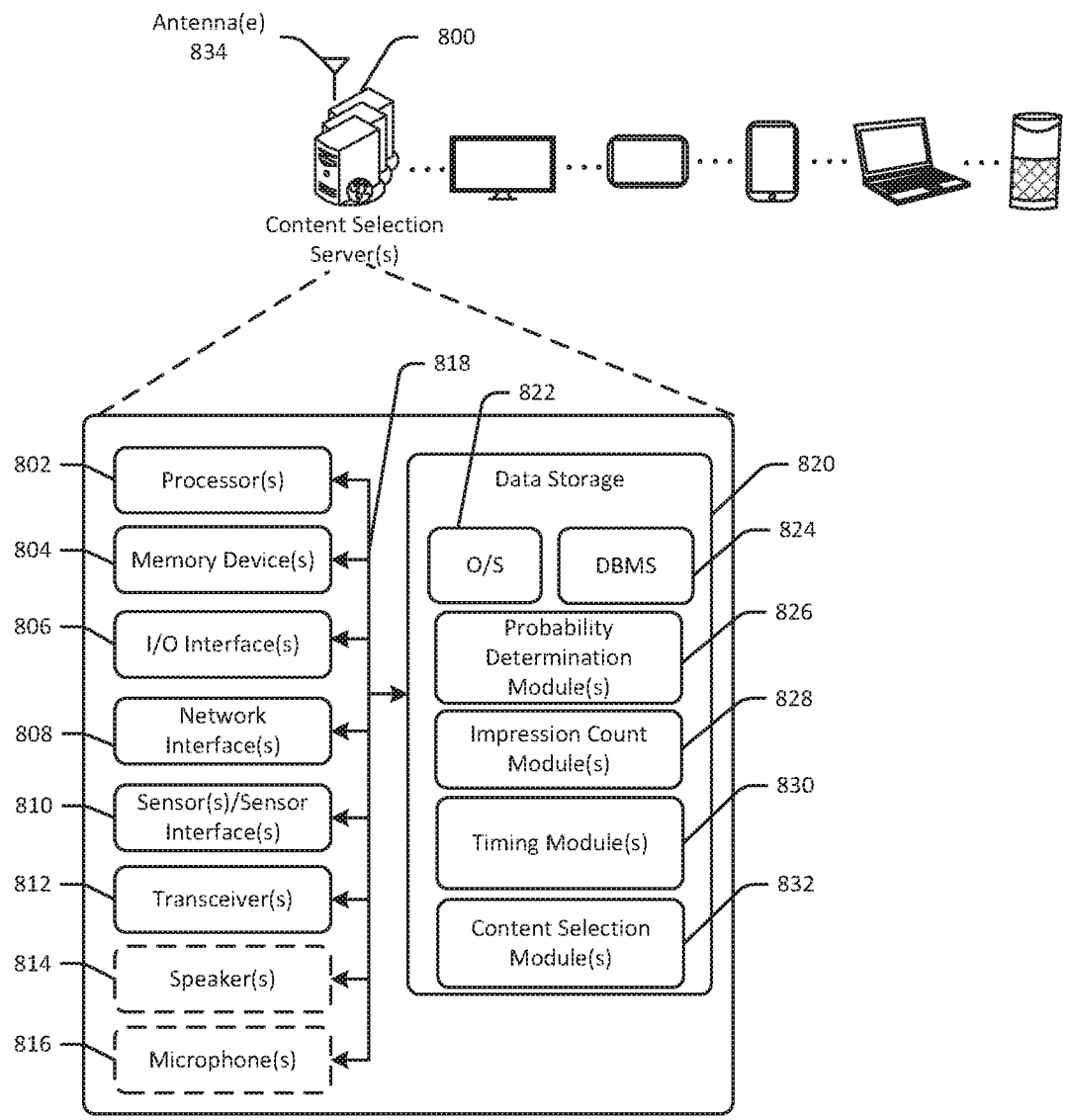
FIG. 8 schematically illustrates an example architecture of a content selection server in accordance with one or more embodiments of the disclosure.

FIG. 8 is a schematic block diagram of one or more illustrative content selection server(s) 800 in accordance with one or more example embodiments of the disclosure. The content selection server(s) 800 may include any suitable computing device including, but not limited to, a server system, a mobile device such as a smartphone, a tablet, an e-reader, a wearable device, or the like; a desktop computer; a laptop computer; a content streaming device; a set-top box; or the like. The content selection server(s) 800 may correspond to an illustrative device configuration for the content selection servers or content delivery servers of FIGS. 1-7.

The content selection server(s) 800 may be configured to communicate via one or more networks with one or more servers, user devices, or the like. The content selection server(s) 800 may be configured to determine eligible content, determine user purchase or interaction data, interact with or perform auction bidding operations, select content or product identifiers, and other operations. The content selection server(s) 800 may be configured to deliver or cause delivery of one or more pieces of content and may further be configured to engage in a bidding process for auctions to present content. In some embodiments, a single remote server or a single group of remote servers may be configured to perform more than one type of content delivery functionality.

The content selection server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the content selection server(s) 800 may include one or more processors (processor(s)) 802, one or more memory devices 804 (generically referred to herein as memory 804), one or more input/output (I/O) interfaces 806, one or more network interfaces 808, one or more sensors or sensor interfaces 810, one or more transceivers 812, one or more optional speakers 814, one or more optional microphones 816, and data storage 820. The content selection server(s) 800 may further include one or more buses 818 that functionally couple various components of the content selection server(s) 800. The content selection server(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the content selection server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the content selection server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more probability determination module(s) 826, one or more impression count module(s) 828, one or more timing module(s) 830, and/or one or more content selection module(s) 832. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by components of the content selection server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, an example datastore(s) may include, for example, historical data for campaigns, inventory data, campaign performance data, and/or other information.

The processor(s) 802 may be configured to access the memory 804 and execute computer-executable instructions loaded therein. For example, the processor(s) 802 may be configured to execute computer-executable instructions of the various program module(s), applications, engines, or the like of the content selection server(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the probability determination module(s) 826 may include computer-executable instructions, code, or the like that responsive to execution by one or more of the processor(s) 802 may perform functions including, but not limited to, determining a probability that a bid amount will be a winning bid amount and/or that an impression will be served, determining a probability distribution for various content impressions and a likely number of impressions that have been presented, determining a probability of whether a bid amount was a winning bid amount, determining whether to select certain content or a certain product identifier, and the like.

The impression count module(s) 828 may include computer-executable instructions, code, or the like that responsive to execution by one or more of the processor(s) 802 may perform functions including, but not limited to, tracking a number of responses to bid requests, incrementing impression counter values, resetting impression counter values after a time interval, and the like.

The timing module(s) 830 may include computer-executable instructions, code, or the like that responsive to execution by one or more of the processor(s) 802 may perform functions including, but not limited to, determining that an impression counter value should be reset, determining a number of impressions that may have been presented over a certain time interval, and the like.

The content selection module(s) 832 may include computer-executable instructions, code, or the like that responsive to execution by one or more of the processor(s) 802 may perform functions including, but not limited to, determining base bid values, determining bid modifiers, determining viewability constraint statuses, determining eligibility for certain content or product identifiers for specific users, determining whether content or a product identifier has been previously presented to a user or a user device, determining households and/or related users, determining dislike events, and the like.

Referring now to other illustrative components depicted as being stored in the data storage 820, the O/S 822 may be loaded from the data storage 820 into the memory 804 and may provide an interface between other application software executing on the content selection server(s) 800 and the hardware resources of the content selection server(s) 800. More specifically, the O/S 822 may include a set of computer-executable instructions for managing hardware resources of the content selection server(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the content selection server(s) 800 is a mobile device, the DBMS 824 may be any suitable lightweight DBMS optimized for performance on a mobile device.

Referring now to other illustrative components of the content selection server(s) 800, the input/output (I/O) interface(s) 806 may facilitate the receipt of input information by the content selection server(s) 800 from one or more I/O devices as well as the output of information from the content selection server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the content selection server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The content selection server(s) 800 may further include one or more network interface(s) 808 via which the content selection server(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 834 may include any suitable type of antenna depending, for example, on the communications protocols used to transmit or receive signals via the antenna(e) 834. Non-limiting examples of suitable antennae may include directional antennae, non-directional antennae, dipole antennae, folded dipole antennae, patch antennae, multiple-input multiple-output (MIMO) antennae, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the content selection server(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the content selection server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 814 may be any device configured to generate audible sound. The microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the content selection server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the content selection server(s) 800 may include alternate and/or additional hardware, software, or firmware components beyond those described or depicted without departing from the scope of the disclosure. More particularly, it should be appreciated that software, firmware, or hardware components depicted as forming part of the content selection server(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

determining, by one or more computers coupled to at least one memory, a first set of eligible product identifiers for a user having a user identifier, the first set of eligible product identifiers comprising a first product identifier and a second product identifier;

receiving a first bid request for a first content delivery slot at a webpage, the first bid request comprising the user identifier;

determining a ranking of the first product identifier and the second product identifier, wherein the first product identifier is ranked higher than the second product identifier;

determining a first response to the first bid request, wherein the first response comprises the first product identifier and a first bid amount;

sending the first response at a first time;

incrementing an impression counter for the user identifier to a value of 1, the value of 1 indicating that a content impression comprising the first product identifier was presented to the user, wherein the impression counter is incremented before receiving confirmation that the content impression was presented;
receiving a second bid request for a second content delivery slot at the webpage within 5 seconds of receiving the first bid request, the second bid request comprising the user identifier;
determining that the impression counter has a value of 1;
determining that the second product identifier was ranked lower than the first product identifier at the first time;
determining a second response to the second bid request, wherein the second response comprises the second product identifier and a second bid amount;
sending the second response at a second time;
determining that 10 seconds have elapsed after the first time; and
resetting the impression counter for the user identifier.

2. The method of claim 1, wherein the first set of eligible product identifiers further comprises a third product identifier, and wherein determining the ranking of the first product identifier and the second product identifier comprises determining that the third product identifier is ranked lower than the first product identifier and the second product identifier, the method further comprising:
determining a first probability value using the first bid amount;
determining a second probability value using the second bid amount;
determining a probability distribution using the first probability value and the second probability value;
receiving a third bid request for a third content delivery slot within 5 seconds of receiving the second bid request, the third bid request comprising the user identifier;
determining that one of the first bid amount or the second bid amount was a winning bid using the probability distribution;
determining that one of the first bid amount or the second bid amount was a losing bid using the probability distribution;
incrementing the impression counter to a value of 1;
determining that the second product identifier was ranked lower than the first product identifier and higher than the third product identifier at the first time;
determining a third response to the third bid request, wherein the third response comprises the second product identifier; and
sending the second response at a third time.

3. The method of claim 1, wherein the second response further comprises a fallback image identifier, the method further comprising:
determining that the second bid amount is a winning bid amount;
determining, after sending the second response, that the user previously indicated that content associated with the second product identifier was disliked; and
causing the fallback image to be rendered at the second content delivery slot instead of an image associated with the second product identifier.

4. The method of claim 1, further comprising:
receiving clickstream data for the user identifier, wherein the clickstream data comprises user interaction data for user interactions with digital content;
determining that the clickstream data comprises the first product identifier and the second product identifier;
determining a first number of user interactions with the first product identifier in the clickstream data; and
determining a second number of user interactions with the second product identifier in the clickstream data;
wherein determining the ranking of the first product identifier and the second product identifier comprises determining the ranking of the first product identifier and the second product identifier using the first number and the second number.

5. A method comprising:
determining, by one or more computer processors coupled to at least one memory, a first bid request for a first content delivery slot at a first time, the first bid request comprising a first user identifier;
determining a ranking of candidate product identifiers for which the first user identifier is eligible at the first time, wherein the ranking indicates that a first product identifier is ranked higher than a second product identifier;
determining a second bid request for a second content delivery slot at a second time, the second bid request comprising the first user identifier, wherein the second time is within a predetermined time interval of the first time;
determining an impression counter value for the first user identifier at the second time;
selecting a product identifier from the candidate product identifiers using the impression counter value;
determining a first bid amount for the second bid request using the product identifier; and
increasing the impression counter value for the first user identifier before receiving confirmation that an impression was presented at the first content delivery slot.

6. The method of claim 5, further comprising:
sending a first response to the first bid request.

7. The method of claim 5, wherein selecting the product identifier from the candidate product identifiers using the impression counter value comprises:
(i) determining that the product identifier has a rank value that corresponds to the impression counter value in the ranking, or (ii) determining that the product identifier has a rank value that is greater than the impression counter value in the ranking.

8. The method of claim 5, further comprising:
determining that the first bid request is associated with a first device identifier;
determining a third bid request for a third content delivery slot at a third time, the third bid request comprising a second device identifier;
determining that the second device identifier is associated with the first user identifier;
determining the impression counter value for the first user identifier at the third time; and
selecting a product identifier from the candidate product identifiers using the impression counter value at the third time.

9. The method of claim 5, wherein selecting the product identifier from the candidate product identifiers using the impression counter value comprises selecting the second product identifier from the candidate product identifiers using the impression counter value, the method further comprising:
receiving an indication that first content comprising the second product identifier is disliked, wherein the indication is received from a first user device associated with the first user identifier;
determining a third bid request for a third content delivery slot, the third bid request comprising a second user identifier;

determining that the second user identifier is associated with the first user identifier; and preventing content comprising the second product identifier from being rendered at a second user device associated with the second user identifier.

10. The method of claim 9, wherein determining that the second user identifier is associated with the first user identifier comprises determining that the first user identifier and the second user identifier have the same shipping address.

11. The method of claim 5, further comprising:
sending a first response to the first bid request with a first bid amount;
determining a first probability value using the first bid amount;
sending a second response to the second bid request with a second bid amount;
determining a second probability value using the second bid amount;
determining a predicted number of impressions that have been served to the first user identifier based at least in part on the first probability value and the second probability value; and
setting the impression counter value to the predicted number of impressions.

12. The method of claim 5, further comprising:
receiving clickstream data for the first user identifier, wherein the clickstream data comprises user interaction data for user interactions with digital content;
determining that the clickstream data comprises the first product identifier and the second product identifier;
determining a first number of user interactions with the first product identifier in the clickstream data; and
determining a second number of user interactions with the second product identifier in the clickstream data;
wherein determining the ranking of candidate product identifiers for which the first user identifier is eligible at the first time comprises determining the ranking of the first product identifier and the second product identifier using the first number and the second number.

13. The method of claim 5, further comprising:
determining a user device identifier associated with the first user identifier;
determining that clickstream data for the first user identifier comprises the first product identifier;
determining that the first product identifier is for a second user identifier; and
preventing selection of content comprising the first product identifier in response to bid requests comprising the user device identifier.

14. The method of claim 13, wherein determining that the first product identifier is for the second user identifier comprises:
determining that a propensity to purchase the first product identifier for the first user identifier is below a threshold value.

15. The method of claim 5, wherein the second time is less than or about 5 seconds after the first time.

16. The method of claim 5, further comprising:
resetting the impression counter value periodically.

17. A device comprising:
at least one memory that stores computer-executable instructions; and
at least one processor configured to access the at least one memory and execute the computer-executable instructions to:

determine a first bid request for a first content delivery slot at a first time, the first bid request comprising a first user identifier;
determine a ranking of candidate product identifiers for which the first user identifier is eligible at the first time, wherein the ranking indicates that a first product identifier is ranked higher than a second product identifier;
determine a second bid request for a second content delivery slot at a second time, the second bid request comprising the first user identifier, wherein the second time is within a predetermined time interval of the first time;
determine an impression counter value for the first user identifier at the second time;
select a product identifier from the candidate product identifiers using the impression counter value;
determine a first bid amount for the second bid request using the product identifier; and
increase the impression counter value for the first user identifier before receiving confirmation that an impression was presented at the first content delivery slot.

18. The device of claim 17, wherein the at least one processor is further configured to access the at least one memory and execute the computer-executable instructions to:
send a first response to the first bid request.

19. The device of claim 17, wherein the at least one processor is further configured to access the at least one memory and execute the computer-executable instructions to:
determine that the first bid request is associated with a first device identifier;
determine a third bid request for a third content delivery slot at a third time, the third bid request comprising a second device identifier;
determine that the second device identifier is associated with the first user identifier;
determine the impression counter value for the first user identifier at the third time; and
select a product identifier from the candidate product identifiers using the impression counter value at the third time.

20. The device of claim 17, wherein the at least one processor is further configured to access the at least one memory and execute the computer-executable instructions to:
send a first response to the first bid request with a first bid amount;
determine a first probability value using the first bid amount;
send a second response to the second bid request with a second bid amount;
determine a second probability value using the second bid amount;
determine a predicted number of impressions that have been served to the first user identifier based at least in part on the first probability value and the second probability value; and
set the impression counter value to the predicted number of impressions.

* * * * *